United States Patent [19]
Pontius

[11] 3,955,943
[45] May 11, 1976

[54] DIFFUSION METHOD OF SEPERATING GASEOUS MIXTURES

[75] Inventor: Rex B. Pontius, Rochester, N.Y.

[73] Assignee: The United States of America as represented by the United States Energy Research and Development Administration, Washington, D.C.

[22] Filed: June 16, 1948

[21] Appl. No.: 33,282

[52] U.S. Cl. .................................................. 55/16
[51] Int. Cl.[2] ....................................... B01D 59/12
[58] Field of Search ................... 183/115, 2.2; 55/16

[56] References Cited
UNITED STATES PATENTS
2,964,124  12/1960  Peierls et al. .......................... 55/16

OTHER PUBLICATIONS
Maier, "Mechanical Concentration of Gases", U.S. Bureau of Mines Bulletin, No. 431, pp. 9, 103 & 104, (1940).

*Primary Examiner*—E. A. Miller
*Attorney, Agent, or Firm*—Dean E. Carlson; Leonard Belkin

[57] ABSTRACT

A method of effecting a relatively large change in the relative concentrations of the components of a gaseous mixture by diffusion which comprises separating the mixture into heavier and lighter portions according to major fraction mass recycle procedure, further separating the heavier portions into still heavier subportions according to a major fraction mass recycle procedure, and further separating the lighter portions into still lighter subportions according to a major fraction equilibrium recycle procedure.

6 Claims, 1 Drawing Figure

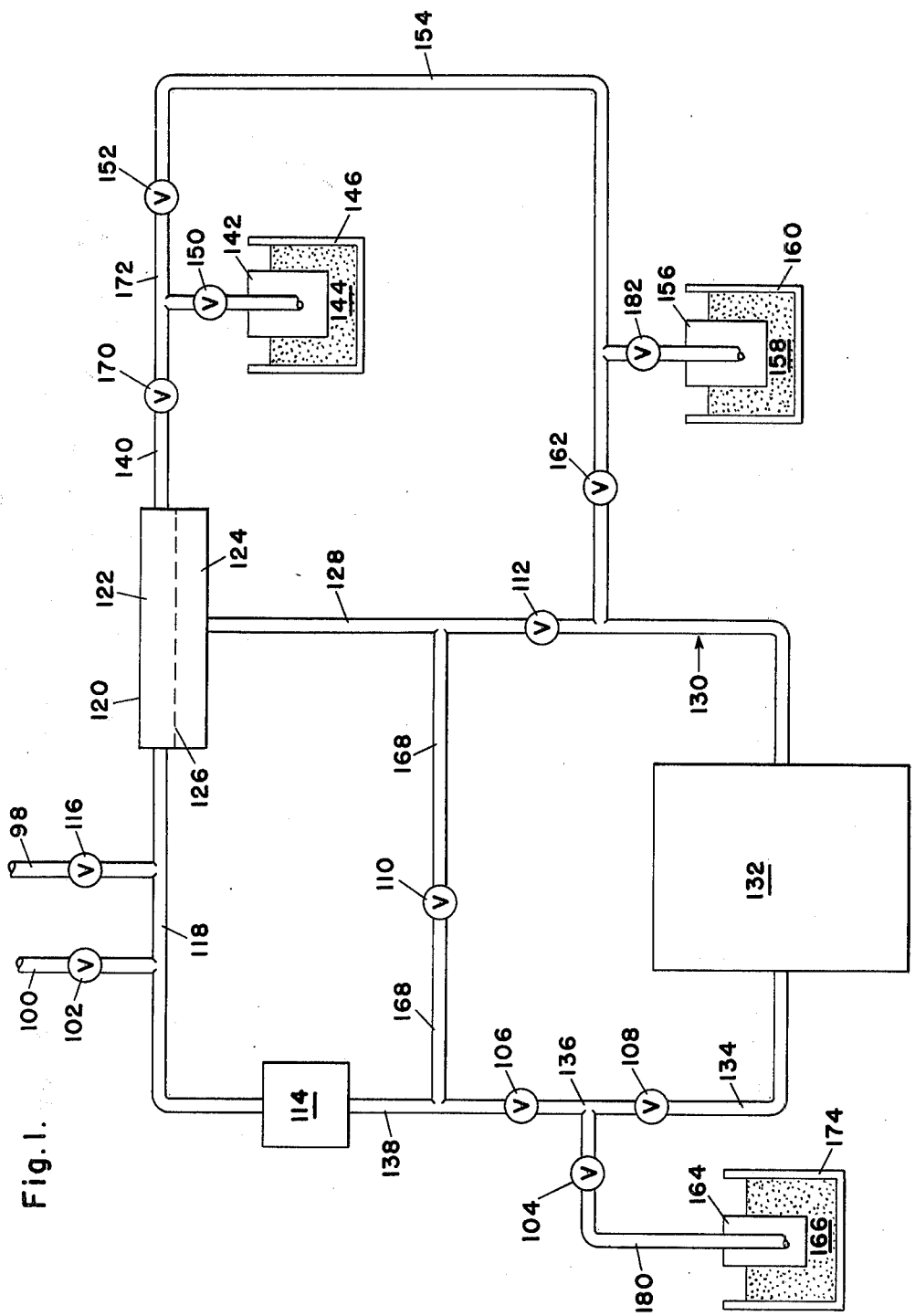

DIFFUSION METHOD OF SEPERATING GASEOUS MIXTURES

This invention was made during the course of, or under a contract with the United States Atomic Energy Commission or a predecessor thereof.

The present invention relates to an improved method of effecting a relatively large change in the relative concentration of the components of a gaseous mixture by diffusion.

The method of the present invention is particularly well adapted for use in connection with diffusional separation of different isotopic species of an element or compound and will be so described, although as the description proceeds, it will become apparent that it may be used equally well in connection with the separation of other gaseous mixtures.

In recent years, a number of isotopes of elements have been discovered which possess interesting and useful characteristics and it has become desirable to develop methods of separating and concentrating such isotopes so that they may be studied and used. Because of the chemical identity of the isotopes of an element, the problem of separating isotopes is a difficult one. Various methods have been previously proposed for effecting such a separation, among which is the so-called diffusion method wherein a gaseous mixture of isotopic species of an element or compound of the element is passed into contact with a finely porous, permeable membrane and a portion of the gaseous mixture is caused to flow through the membrane. Under such circumstances, the fraction of the mixture that passes through the membrane is enriched somewhat with respect to the lighter component of the mixture. The extent to which enrichment takes place in a single diffusion stage, i.e., a single passage of the mixture into contact with the diffusion membrane is usually very small and several methods of multiplying this effect have been previously considered.

The maximum theoretical separation of the constituents of gaseous mixtures obtainable by a single pass into contact with a diffusion membrane is given by the equation:

$$\text{separation}_{ideal} = \sqrt{\frac{M_1}{M_2}}$$

where:

$M_1$ is the molecular weight of the heavier component of said mixture, and $M_2$ is the molecular weight of the lighter component of said mixture.

In the case of a gaseous mixture of $UF_6$ containing isotopes of uranium, $U^{235}$ and $U_{238}$, the maximum theoretical separation is $$\text{separation}_{ideal}\ UF_6 = \sqrt{\frac{352}{349}} = 1.00429.$$

The actual separation effected by a single pass of such a mixture into contact with a diffusion membrane is considerably less than that given by the ideal separation expression above.

In accordance with one proposal for increasing such separation, a number of diffusion stages are interconnected in series in a so-called cascade in such manner that the fraction of gas diffusing through the membrane passes on to a succeeding or higher stage of the cascade and the fraction of the gas that does not diffuse through the membrane is recycled to an earlier or lower stage of the cascade. Gaseous mixture of normal isotopic abundance may be fed to an appropriate point in the middle of the cascade, gas enriched with respect to the lighter component may be withdrawn from the top of the cascade and gas enriched with respect to the heavier constituent of the mixture may be withdrawn from the bottom of the cascade.

In cases where separation of the isotopes is particularly difficult, as, for example, where it is desired to separate the isotopes of uranium by diffusional separation of uranium hexafluoride, a very large number of diffusion stages are required and hence a considerable quantity of the process gas is held up in the system at any given time. In other words, a relatively large quantity of the process gas is required in order to operate the cascade at all. There are numerous instances where such a large quantity of the gaseous mixture may not be available and in such cases it is necessary that a different type of separative method be used.

In the construction of a cascade such as that described above, the manufacture of suitable porous, permeable membranes presents a major problem. In order to operate efficiently as a diffuser-separator, such membranes must have exceedingly fine holes, i.e., holes that are smaller in diameter than can be seen by the aid of a light microscope. As an incident of the manufacture of such membranes, it is desirable to have a simple and satisfactory method of testing their separation efficiency. The membranes may be tested in a variety of ways such as, for example, by passing a gas mixture of known composition into contact with the membrane and determining the change in composition that occurs as the gas passes through the membrane.

In cases where the membrane is to be used in contact with an isotopic gaseous mixture which is either difficultly separable or highly corrosive, or both, it is frequently desirable that the membrane be tested in contact with the process gas that is to be used in the diffusion separation cascade. In making a test of this character, a special problem is presented where a process gas such as uranium hexafluoride is used because of the very small change in composition that occurs in a single pass through the membrane. This change in composition may be of the same order of magnitude as the probable error in the analytical method used to analyze the gas mixture. Accordingly, it is important that the testing method used be of such a character as to produce a relatively large separation so that the normal analytical errors do not produce an unduly large error in the final result.

It is accordingly an object of the present invention to provide an improved method of testing the separative efficiency of porous, permeable membranes.

It is another object of the present invention to provide an improved method and apparatus for separating the components of a difficultly separable gaseous mixture by diffusion through a finely porous, permeable membrane.

It is still another object of the present invention to provide a method and apparatus for diffusion separation which is capable of producing improved separation of components of a gaseous mixture in a single stage.

It is a further object of the present invention to provide a separative method of this character which is operative with a relatively small quantity of the gaseous mixture.

Other objects of this invention will be in part obvious and in part pointed out hereinafter.

A mass recycle procedure may be defined as a gas diffusion separation process which comprises passing a gaseous mixture into contact with a porous, permeable diffusion separation membrane in a gas circulation system in a manner such that the portion thereof which diffuses through said membrane is recirculated in said system and passed into contact with said membrane, and such that the portion of said mixture which is rejected from the said membrane without diffusing therethrough passes from said circulating system and is collected in successive separate portions, and thereafter further diffusively separating each of the collected successive portions in said circulating system. An equilibrium recycle procedure may be defined as a gas diffusion separation process which comprises introducing a gaseous mixture into a gas circulation system, circulating said mixture in said system so as to pass it into contact with a porous, permeable diffusion separation membrane, removing the portion of said mixture rejected from said membrane without diffusing through said membrane from said circulation system at the same rate that the original gaseous mixture is introduced into said system, and continuing said circulation within said system until the concentration of the mixture rejected from said circulating system is substantially identical with the composition of the mixture being introduced into said circulating system. A major fraction recycle denotes a procedure whereby a major fraction of the gas mixture passing into contact with a diffusion membrane is diffused through said membrane and is circulated in a circulating system containing said membrane after having diffused therethrough so as to be continuously repassed into contact with said membrane. A percent by weight recycle similarly denotes the circulation of a certain percentage by weight of the gaseous mixture passing into contact with, and diffusing through, a porous, permeable diffusion membrane in a circulation system, so as to cause it to be continuously repassed into contact with said porous, permeable membrane. These recycle procedures are operated so as to continuously pass the diffused portion into contact with the membrane. These procedure descriptions are given generally for defining the diffusion separation procedures which are employed in practicing the present invention.

In one of its broader aspects the method of the present invention is a singularly effective method of producing a very high difference in concentration of samples of a gaseous mixture and comprises the steps of diffusively separating a gaseous mixture into heavier and lighter portions by a mass recycle procedure, further diffusively separating the lighter portions into still lighter subportions by equilibrium recycle procedure, and further separating the heavier portions into still heavier subportions by mass recycle procedure.

One procedure which has been found particularly suitable for the separation of a very difficultly separable, gaseous mixture such as a gaseous mixture of the isotopes of uranium comprises circulating a gaseous mixture of the uranium isotopes in a relatively large circulating system, causing a major fraction of said mixture to be diffused through said membrane and causing a minor fraction of said mixture to be rejected from said system without diffusing through said membrane, circulating the diffused portion of said mixture in said system so as to repass it into contact with said membrane, collecting the initial one-half of the mixture which is rejected from said circulating system, continuing said circulation until insufficient mixture remains in said relatively large circulating system to develop a sufficient pressure drop across said membrane to cause said major fraction of said mixture to diffuse through said membrane, collecting the residue mixture which remains in the relatively large circulating system and further diffusively separating said residue mixture in a relatively small diffusion system according to the equilibrium recycle procedure, recirculating the initially collected half of the reject mixture according to a mass recycle procedure and collecting the initially rejected half of this latter mixture and subjecting it to further mass recycle separation. It has been found that very high efficiency may be attained by employing procedures wherein the major fraction was between 80 and 97 percent by weight.

The method of the present invention may be more clearly described with reference to the accompanying drawing which diagrammatically illustrates a system suitable for carrying out the present invention. This apparatus comprises an arrangement of conduits, valves and containers which may be employed to supply a gaseous mixture to a diffusion separation membrane and make suitable collections of the portions passing therefrom as desired.

By the large diffusion system is meant the apparatus including the manifold 118, conduits 128, 130, 134, 136, 138, the volume 132, the pump 114, the membrane holder 120, and the valves 106, 108 and 112. By the small diffusion system is meant the apparatus including manifold 118, conduits 128, 138 and 168, pump 114, membrane holder 120 and valve 110. When an apparatus, such as is illustrated in FIG. 1, is operated according to the method of the present invention for effecting a large change in the relative concentrations of uranium isotopes in a small sample of gaseous uranium hexafluoride, said sample is introduced through conduit 100 and valve 102 to the large diffusion system. For this operation valves 104, 116, 110, 162, and 170 are closed, and valves 102, 106, 108 and 112 are opened. The valve 102 is then closed and valves 170 and 152 are opened, valve 150 being kept closed. The pump 114 causes the gaseous mixture to circulate in the large diffusion system, a lighter major fraction, e.g., in excess of 90% by weight of the gas circulating therein is caused to diffuse through membrane 126, and a heavier minor fraction of said mixture is caused to pass from the membrane holder 120 through the high pressure chamber 122 thereof without diffusing through membrane 126, passing instead through conduits 140, 154 and manifold 172 to container 156 where it is condensed in solid form by the cooling action of the coolant mixture 158 in container 160. Such a mixture may contain, for example, pulverized solid carbon dioxide mixed with an organic solvent such as acetone or trichloroethylene to form a slush. Such a slush maintains the temperature of the container 156 at approximately that of dry ice. The slush is also used in conjunction with containers 142 and 164 and is indicated by the numerals 144 and 166. When the first successive portion equal to approximately half of the mixture of uranium isotopes in the form of gaseous fluoride has been caused to pass from the high pressure chamber 122 of the diffusion membrane holder 120 into the container 156, the valve 152 is closed, and the valve 150 is opened. The second successive portion of said mixture of uranium isotopes is thus caused to be collected in container 142. When insufficient uranium hexafluoride residue remains in the large circulating system to enable a sufficient average forepressure of said gas to be maintained in the high pressure chamber 122 of the diffusion membrane holder 120, the valves 150 and 170 are closed, and the valve 104 is opened, thus causing the light residue mixture remaining in the large circulating system to be condensed in the container 164. Thereafter, the valves 108 and 122 are closed and valve 162 is opened. The slush is removed from container 156 and said container is heated sufficiently to cause the first collected portion of the heavier fraction of uranium hexafluoride to be rarified and to expand into the volume 132. A slush bath may be applied to a portion of volume 132 to cause said uranium hexafluoride to condense therein. After substantially all the first collected portion of the heavier fraction has been transferred from the container 156 to the volume 132, valve 162 is closed.

In order to further diffusively separate the light residue mixture, the slush bath 166 and its reservoir 174 are removed from container 164, and the light uranium hexafluoride residue mixture condensed therein is caused to flow through conduit 180, valve 104, conduit 136 and valve 106 into the small diffusion system through conduit 138. Pump 114 causes said residue mixture to circulate through the small diffusion system. Valves 170, 110, and 150 are opened, and valve 152 is closed, and the minor fraction of the mixture, which passes from the high pressure chamber 122 of the membrane holder 120, is caused to condense in container 142 after having passed through valves 170 and 150, and manifold 172. The major fraction of the mixture entering the membrane holder 120 from manifold 118 is caused to flow through membrane 126 to low pressure chamber 124 from which it flows through conduit 128. This major fraction is returned to the pump 114 through conduits 168 and 138 and valve 110. In conduit 138 it combines with the residue mixture which is caused to flow from the container 164. The valves 104 and 106 regulate the flow of the residue mixture which had been condensed in container 164 therefrom. The residue mixture is caused to flow from said container 164 to the small circulating system at a rate substantially equal to the rate at which the undiffused or minor fraction of said mixture is caused to flow from the high pressure chamber 122 of membrane holder 120.

After a concentration of the lighter component of the mixture leaving the membrane holder 120 through conduit 140 becomes equivalent to that of the lighter component of the residue mixture entering the smaller circulating system from container 164, the circulation is stopped, valves 106 and 170 are closed, and the sample of the mixture contained in the smaller circulating system is removed therefrom through valve 116 and conduit 98 to a receptacle not shown. This treatment of the light residue mixture is an example of an equilibrium recycle procedure.

After the circulating system has been completely evacuated through the conduit 98, valves 116, 150, 110 and 104 are closed and valves 112, 106 and 108 are opened. The pump 114 causes circulation of the heavy fraction which has been returned to the larger circulating system. A first fractional part of less than one-tenth of the mixture entering holder 120 is caused to flow therefrom through conduits 140 and 154 and manifold 172 by opening valves 182 and 152 and regulating the flow of said first fractional part through valve 170. After a subportion of approximately one-half of the mixture contained in the larger circulating system has been rejected from the membrane holder 120 and collected in the container 156, the valve 152 is closed and the valve 150 is opened. The contents of the large circulating system are removed therefrom by condensation in trap 142 after fully opening valve 170. When the large circulating system has been evacuated, valves 170 and 150 are closed, slush 158 is removed from container 156 and sufficient heat is applied to said container 156 to cause the contents thereof to be volatilized and to flow through the conduit 154 and valve 162 to enter the large diffusion system. Dry ice slush may be applied to the container 132 to cause a quantitative transfer of the uranium hexafluoride from the container 156 and various intermediate conduits to the larger circulating system. When substantially all the uranium hexafluoride has been thus transferred, valve 162 is closed, and valves 152 and 170 are opened thereby permitting a further diffusive separation of the components of the first collected subportion. This procedure for treatment of the first collected portion of the heavy fraction is an example of a mass recycle. This procedure is repeated a desired number of times or until insufficient heavier fraction is collected to fill the diffusion system.

The advantages of the present invention which arise from the combination of procedures such as are outlined above are particularly apparent when it is considered that approximately the same separation may be effected in less than one-sixth the time that is necessary using a series of mass recycle steps alone, and in addition that the equilibrium recycle procedure is not capable of effecting a comparable separation alone. The residue mixture which remains after the first mass recycle step contains the highest concentration of light component of any sample obtainable by a mass recycle procedure. Each first collected portion of each recycled heavy fraction contains the highest percentage of heavy component of any portion collected to that point according to the mass recycle procedure. If a sufficiently large sample is available, the recirculation of this heavy reject fraction may be carried out a plurality of times, such that greater and greater concentrations of heavier material in the reject fraction are produced. The present invention is particularly suitable where such larger samples are not available. A more efficient mass recycle procedure comprises collecting the initial 20 or 30 percent by weight of the initially rejected gaseous mixture and subsequently recirculating this collected mixture according to the mass recycle procedure. This procedure is more efficient than the 50 percent by weight mass recycle described in the embodiment but cuts down on the number of recycle steps that can be effected for a single sample. By the method of the present invention mixtures of $UF_6$ are produced having a large difference in the concentration of the lighter component, by combining the steps of equilibrium recycle and mass recycle to their greatest advantage in apparatus the volume relations of which make greatest use of this advantage.

One of the preferred applications of the present invention comprises continuing the first mass recycle to a point where insufficient residue mixture remains in the diffusion system to carry on the mass recycle procedure, and rediffusing this residue mixture by the equilibrium recycle procedure in a smaller system to achieve a high separation of small samples in a short time.

It is apparent from the foregoing description that the present invention provides a singularly effective method for concentrating the isotopes of a small sample of a difficultly separable isotopic mixture.

As will be noted from the disclosed embodiment above, the same membrane was repeatedly exposed to the various flowing isotopic mixtures incident to the performance of the present method. It has been found that the separation effected by a membrane as a result of said flowing is a characteristic of the separation properties of said membrane. Thus, one of the broader aspects of the present invention comprises determining the separation characteristics of a porous, permeable membrane by changing the relative concentration of the components of a gaseous isotopic mixture as described above and correlating the change produced with the change produced by carrying out an identical separation procedure with a membrane of known characteristics. Since in testing membranes for their separating ability with respect to a difficultly separable mixture, such as $U^{235}F_6-U^{238}F_6$, the measurement which limits the accuracy of the method is the relative concentration of the light component in the lightest and in the heaviest portion separated by said membrane, the present method has greater utility than previously disclosed methods, because of the six-fold increase in concentration difference obtainable within the same time interval over that possible by previously disclosed methods.

Since many embodiments might be made of the present invention and since many changes might be made in the embodiment described, it is to be understood that the foregoing description is to be interpreted as illustrative only and not in a limiting sense.

I claim:

1. A method of separating and recovering in relatively concentrated form the heavier and lighter components of a relatively small batch of gaseous mixture which comprises flowing said mixture against one face of a porous permeable membrane in a diffusion separation system to cause a first fraction of said mixture enriched with respect to the lighter component thereof to diffuse through said membrane and to cause a second fraction enriched with respect to the heavier component of said mixture to flow past said membrane without diffusing therethrough, continuously circulating the first fraction in said system to cause said first fraction to pass repeatedly into contact with said membrane, withdrawing and successively collecting the second fraction of said mixture flowing from said system in successive portions, separately collecting the light residue mixture which remains in said system, reducing the size of the system to accommodate the reduced volume of said collected light residue mixture, supplying said residue mixture to a diffusion separation membrane through the reduced diffusion system so as to cause said light residue mixture to flow into contact with the membrane whereby a lighter subfraction of said residue mixture passes through said membrane and whereby a heavier subfraction of said residue mixture flows from said membrane without diffusing therethrough, said heavier subfraction being removed from said reduced system as it flows from said membrane, said residue mixture being supplied to said smaller diffusion system at a rate equivalent to the rate at which said heavier subfraction is withdrawn from said smaller diffusion system after having passed into contact with said membrane, causing said lighter subfraction which is diffused through said membrane to be recirculated through said reduced diffusion system and into contact with said membrane, combining said lighter subfraction as it recirculates in said smaller diffusion system with said light residue mixture entering said smaller diffusion system, stopping said recirculation in said reduced diffusion system when the concentration of the light component in said heavier subfraction which flows from said membrane without diffusing therethrough is equal to the concentration of the light component in said entering residue mixture, removing the circulating mixture from said reduced diffusion system when said concentrations are equal, enlarging the size of the system to accommodate the volume of the separately collected portions of the heavy second fraction of the original mixture, circulating the first collected portion of said second fraction against a membrane in said enlarged diffusion system so as to cause a first subfraction of said first collected portion to diffuse through said membrane and to cause a second and heavier subfraction of said first collected portion to flow from said membrane without diffusing therethrough and successively collecting as a concentrated heavy gas said subfraction in successive portions.

2. The method of claim 1 wherein the first fraction enriched with respect to the lighter component is a major fraction and wherein the second fraction enriched with respect to the heavier component is a lesser fraction, wherein the lighter subfraction of the residue mixture is a lighter major subfraction and wherein the heavier subfraction of the residue mixture is a heavier lesser subfraction, and wherein the first subfraction of the first collected portion is a major subfraction and wherein the second and heavier subfraction is a lesser and heavier subfraction.

3. The method of claim 1 wherein the first fraction of the mixture enriched with respect to the lighter component is a fraction of greater than 90 weight percent and wherein the second fraction enriched with respect to the heavier component is a fraction of less than 10 weight percent, wherein the lighter subfraction of the residue mixture is a subfraction of greater than 90 weight percent and wherein the heavier subfraction of the residue mixture is a subfraction of less than 10 weight percent, and wherein the first subfraction of the first collected portion is a subfraction of greater than 90 weight percent and wherein the second and heavier subfraction is a heavier subfraction of less than 10 weight percent.

4. The method of separating and recovering in relatively concentrated form the heavier and lighter components of a relatively small batch of gaseous mixture which comprises flowing said mixture against one face of a porous permeable membrane is a diffusion separation system to cause a fraction of more than 90 weight percent of said mixture enriched with respect to the lighter component thereof to diffuse through said membrane and to cause a fraction of less than 10 weight percent enriched with respect to the heavier component of said mixture to flow past said membrane without diffusing therethrough, continuously circulating the 90 weight percent fraction in said system to cause it to pass repeatedly into contact with said membrane, withdrawing and successively collecting the 10 percent fraction of said mixture flowing from said system in two approximately equal successive portions, separately collecting the light residue mixture which remains in said system when insufficient mixture remains to continue such circulation, reducing the size of the system to accommodate the reduced volume of said collected light residue mixture, supplying said residue mixture to a diffusion separation membrane through the reduced volume diffusion system so as to cause said light residue mixture to flow into contact with the membrane whereby a lighter subfraction of greater than 90 weight percent of said residue mixture passes through said membrane and whereby a heavier subfraction of less than 10 weight percent of said residue mixture flows from said member without diffusng therethrough, said heavier subfraction being removed from said reduced system as it flows from said membrane, said residue mixture being supplied to said smaller diffusion system at a rate equivalent to that at which the heavier subfraction is withdrawn from said smaller diffusion system after having passed into contact with said membrane, causing said lighter subfraction which is diffused through said membrane to be recirculated through said reduced diffusion system and into contact with said membrane, combining said lighter subfraction as it recirculates in said smaller diffusion system with said light residue mixture entering said smaller diffusion system, stopping said recirculation in said reduced diffusion system when the concentration of the light component in said heavier subfraction which flows from said membrane without diffusing therethrough is equal to the concentration of the light component in said entering residue mixture, removing the circulating mixture from said reduced diffusion system when said concentrations are equal, enlarging the size of the system to accommodate the volume of the first of the separately collected equal portions of the heavy 10 weight percent fraction of the original mixture, circulating this first collected portion against a membrane in said enlarged diffusion system so as to cause a subfraction of greater than 90 percent of said first collected portion to diffuse through said membrane and to cause a heavier subfraction of less than 10 percent of said first collected portion to flow from said membrane without diffusing therethrough and successively collecting as a concentrated heavy gas said greater than 10 weight percent subfraction in successive portions.

5. The method of claim 4 wherein the successive portions of the less than 10 weight percent fraction collected are between 20 and 30 percent of the mixture flowing from the system and wherein the light residue mixture which remains in the system is collected when insufficient mixture remains to develop the pressure difference across the membrane to cause more than 10 weight percent of the mixture to pass through the membrane.

6. A method of changing the relative concentration of a gaseous mixture to an extent capable of affording a determination of the comparative diffusion properties of porous permeable membrane which comprises causing a gaseous mixture to flow against one face of a porous permeable membrane whose characteristics are to be determined in a larger diffusion separation system to cause a lighter fraction of said mixture enriched with respect to the lighter component thereof to diffuse through said membrane and to cause a heavier fraction enriched with respect to the heavier component of said mixture to flow past said membrane without diffusing therethrough, continuously circulating the lighter fraction in said larger diffusion system to cause said lighter fraction recirculation pass continuously into contact with said membrane, withdrawing and successively collecting the heavier fraction of said mixture flowing from said larger system in two successive portions, collecting the light residue mixture which remains in said larger diffusion system from said system, supplying said residue mixture to said membrane through a smaller diffusion system so as to cause said light residue mixture to flow into contact with said face of said membrane whereby a major fraction of said residue mixture diffuses through said membrane and whereby a lesser fraction of said mixture flows from said membrane without diffusing therethrough, said lesser fraction being removed from said smaller diffusion system as it flows from said membrane, said residue mixture being supplied to said smaller diffusion system at a rate equivalent to the rate at which said lesser fraction is withdrawn from said smaller diffusion system after having passed into contact with said membrane, causing said major fraction which is diffused through said membrane to be recirculated through said smaller diffusion system and into contact with said membrane, combining said major fraction as it recirculates in said smaller diffusion system with said light residue mixture entering said smaller diffusion system, continuing said reciruclation in said smaller diffusion system until the concentration of the light component in said lesser fraction which flows from said membrane without diffusing therethrough is equal to the concentration of the light component in said residue mixture, causing the circulating mixture to be removed from said smaller diffusion system when said concentrations are equal, circulating the first collected of said successively collected portions of said heavier fraction against said face of said membrane in said larger diffusion system so as to cause a first fractional part of said heavier fraction to diffuse through said membrane and to cause a second fractional part of said heavier fraction to flow from said membrane without diffusing therethrough, successively collecting said first fractional part in two successive sub-portions, evacuating said larger diffusion system, introducing the first collected sub-portion into said larger diffusion system, further diffusively separating said first collected sub-portion in the same manner in which said first collected portion of said heavier fraction was separated and repeating this procedure a sufficient number of times until the diffusion characteristics of said membrane with respect to a known standard membrane are established beyond the range of probable error due to the order of magnitude of concentration.

\* \* \* \* \*